US011922334B2

(12) United States Patent
Kuang et al.

(10) Patent No.: US 11,922,334 B2
(45) Date of Patent: Mar. 5, 2024

(54) USING MACHINE LEARNING TO DETERMINE JOB FAMILIES USING JOB TITLES

(71) Applicant: Sequoia Benefits and Insurance Services, LLC, San Mateo, CA (US)

(72) Inventors: Jianhang Kuang, Newark, CA (US); Andrew J. Min, Millbrea, CA (US)

(73) Assignee: Sequoia Benefits and Insurance Services, LLC, San Mateo, CA (US)

( * ) Notice: Subject to any disclaimer, the term of this patent is extended or adjusted under 35 U.S.C. 154(b) by 0 days.

(21) Appl. No.: 18/099,789

(22) Filed: Jan. 20, 2023

(65) Prior Publication Data
US 2023/0162061 A1    May 25, 2023

Related U.S. Application Data

(62) Division of application No. 16/856,382, filed on Apr. 23, 2020, now Pat. No. 11,562,266.

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC ......... H04L 51/02; H04L 67/306; G06N 5/04; G06N 20/00; G06N 3/044; G06N 3/084; G06Q 10/105
See application file for complete search history.

(56) References Cited

U.S. PATENT DOCUMENTS

| 10,409,866 | B1 | 9/2019 | Cheng et al. |
| 10,783,497 | B2* | 9/2020 | Kenthapadi ............ G06N 20/00 |
| 2006/0229896 | A1 | 10/2006 | Rosen et al. |
| 2010/0235202 | A1 | 9/2010 | Strelling et al. |
| 2016/0132896 | A1 | 5/2016 | Guerin et al. |
| 2017/0061383 | A1 | 3/2017 | Miyauchi |
| 2017/0286865 | A1* | 10/2017 | Fang ..................... G06F 16/248 |
| 2017/0286914 | A1* | 10/2017 | Fang ..................... G06N 20/00 |
| 2019/0043127 | A1* | 2/2019 | Mahapatra .......... G06F 16/9535 |
| 2019/0102704 | A1* | 4/2019 | Liu ........................ G06N 20/00 |

(Continued)

OTHER PUBLICATIONS

Hochreiter, S. and Schmidhuber, J., 1997. Long short-term memory. Neural computation, 9(8).

(Continued)

*Primary Examiner* — El Hadji M Sall
(74) *Attorney, Agent, or Firm* — Lowenstein Sandler LLP

(57) ABSTRACT

A method and system for using a trained machine learning model with respect to information pertaining to a job title of multiple job titles to determine a job family of multiple job families that corresponds to the job title is disclosed. First input comprising information identifying the job title associated with an organization of a plurality of organizations is provided to the trained machine learning model. One or more outputs identifying (i) an indication of the job family that identifies a category of personnel positions that are categorized based on one or more characteristics that are shared between the personnel positions of the category, and (ii) a level of confidence that the job family corresponds to the job title is obtained from the trained machine learning model.

20 Claims, 6 Drawing Sheets

(56) References Cited

U.S. PATENT DOCUMENTS

| | | |
|---|---|---|
| 2019/0220824 A1* | 7/2019 | Liu ................ G06Q 10/063112 |
| 2019/0303835 A1 | 10/2019 | Saha et al. |
| 2019/0303836 A1 | 10/2019 | Goyal et al. |
| 2020/0193531 A1 | 6/2020 | Bhatia et al. |
| 2020/0202177 A1 | 6/2020 | Buibas et al. |
| 2020/0410427 A1 | 12/2020 | Haze |

OTHER PUBLICATIONS

Mikolov, Tomas, Ilya Sutskever, Kai Chen, Greg S. Corrado, and Jeff Dean. "Distributed representations of words and phrases and their compositionality." In Advances in neural information processing systems 2013.

Wang, J., Abdelfatah, K., Korayem, M. and Balaji, J., Dec. 2019, DeepCarotene-Job Title Classification with Multi-stream Convolutional Neural Network. In 2019 IEEE International Conference on Big Data (Big Data) (pp. 1953-1961). IEEE.

Javed, F., Luo, Q., McNair, M., Jacob, F., Zhao, M. and Kang, T.S., Mar. 2015, Carotene: A job title classification system for the online recruitment domain. In 2015 IEEE First International Conference on Big Data Computing Service and Applications (pp. 286-293). IEEE.

International Search Report and Written Opinion dated Jul. 28, 2021, on application No. PCT/US2021/028708.

\* cited by examiner

USING MACHINE LEARNING TO DETERMINE JOB FAMILIES USING JOB TITLES

RELATED APPLICATIONS

This application is a divisional application of co-pending U.S. patent application Ser. No. 16/856,382 filed Apr. 23, 2020, which is incorporated herein by reference.

TECHNICAL FIELD

Aspects and embodiments of the disclosure relate to data processing, and more specifically, to using a machine learning model to determine job families using job titles.

BACKGROUND

A human resources department can refer to a department of an organization that is responsible for managing resources related to employees. A human resources department can be tasked with finding, screening, and recruiting job applicants. A human resources department can also be tasked with administering employee programs, such as employee-benefit programs, compensation programs, and training programs, among others.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

An aspect of the disclosure is a method for training a machine learning model using information pertaining to a plurality of job titles, the method comprising: generating training data for the machine learning model, wherein generating the training data comprises: generating first training input, the first training input comprising information identifying the plurality of job titles associated with a plurality of organizations; and generating a first target output for the first training input, wherein the first target output identifies an indication of a plurality of job families, wherein a job family of the plurality of job families identifies a category of personnel positions that are categorized based on one or more characteristics that are shared between the personnel positions of the category; and providing the training data to train the machine learning model on (i) a set of training inputs comprising the first training input, and (ii) a set of target outputs comprising the first target output.

A further aspect of the disclosure is a method for using a trained machine learning model with respect to information pertaining to a job title of a plurality of job titles to determine a job family of a plurality of job families that corresponds to the job title, the method comprising: providing to the trained machine learning model first input comprising information identifying the job title associated with an organization of a plurality of organizations; and obtaining, from the trained machine learning model, one or more outputs identifying (i) an indication of the job family that identifies a category of personnel positions that are categorized based on one or more characteristics that are shared between the personnel positions of the category, (ii) a level of confidence that the job family corresponds to the job title.

A further aspect of the disclosure provides a system comprising: a memory; and a processing device, coupled to the memory, the processing device to perform a method according to any aspect or embodiment described herein. A further aspect of the disclosure provides a computer-readable medium comprising instructions that, responsive to execution by a processing device, cause the processing device to perform operations comprising a method according to any aspect or embodiment described herein.

BRIEF DESCRIPTION OF THE DRAWINGS

Aspects and embodiments of the disclosure will be understood more fully from the detailed description given below and from the accompanying drawings of various aspects and embodiments of the disclosure, which, however, should not be taken to limit the disclosure to the specific aspects or embodiments, but are for explanation and understanding.

DETAILED DESCRIPTION

Figure 1:
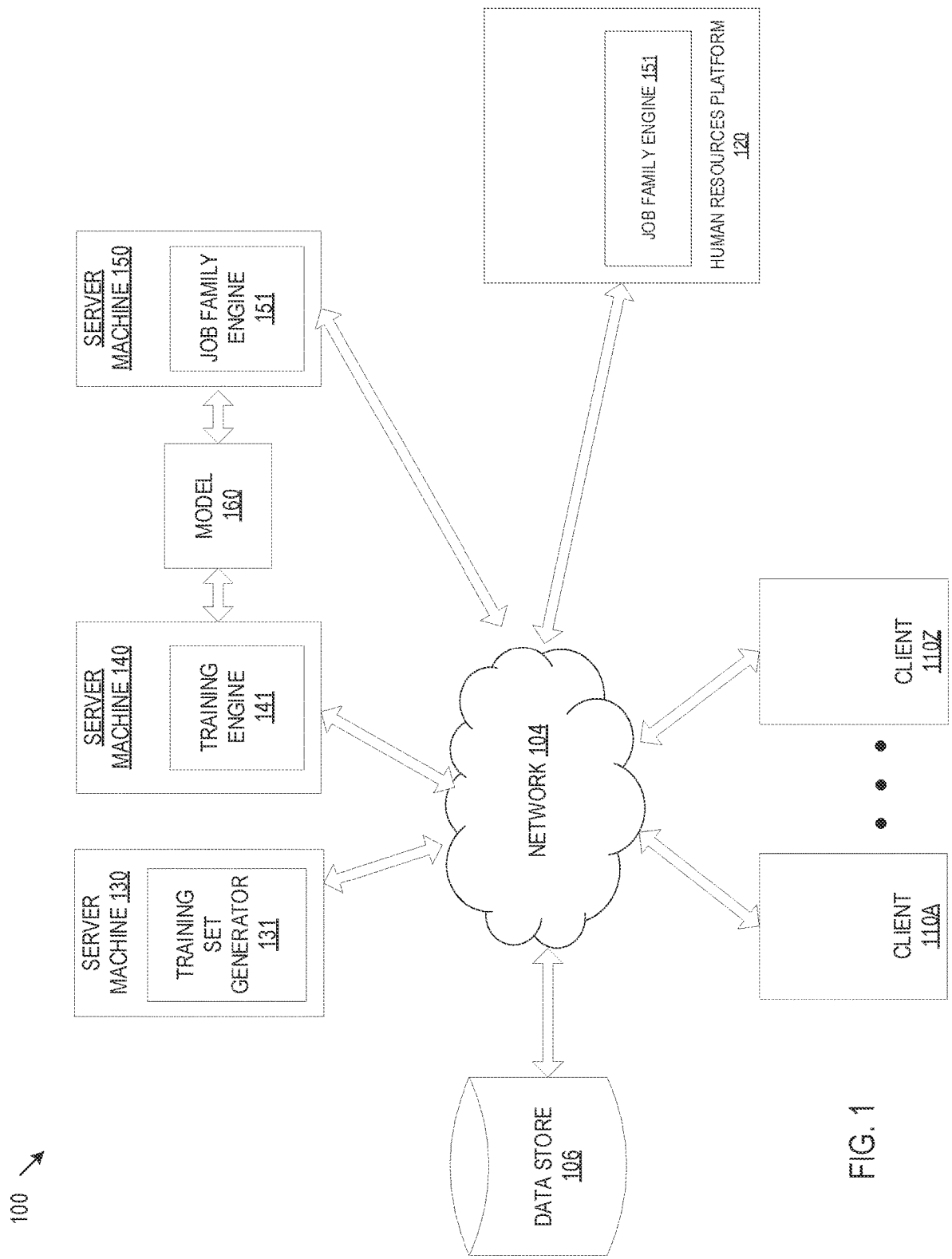
FIG. 1 illustrates an example system architecture, in accordance with some embodiments of the disclosure.

Human resources (HR) departments often use benchmarking to determine how an organization's policies and practices compare with other organizations' policies and practices, and specifically with other organizations' policies and practices in a comparable industry. For example, an HR department may want to determine how their organization's HR information regarding health benefits, retirement benefits, or compensation compares to other organizations' HR information in a comparable industry. HR departments often struggle with such comparisons because the HR information may not be publically available. Further, HR departments may not have the specialized knowledge about different types of jobs, and cannot accurately identify comparable organization-specific personnel positions (e.g., organization-specific personnel jobs) of different organizations and the HR information associated with such organization-specific personnel positions.

Different organizations can have very different job titles for employment positions that have very similar functions. For example, "barista", "coffee house specialist" and "coffee bar attendant" are examples of non-standardized job titles that refer to a similar job function, i.e., make and serve coffee and tea beverages.

In some conventional systems, keyword searches using words in a job title are used to search public databases to identify other organizations' job titles and the HR information associated with those job titles. However, such conventional systems provide very inaccurate and incomplete HR information not only because the HR information is unavailable but also because job titles are not standardized between different organizations, which makes searching inefficient and comparisons inaccurate. Further, some conventional systems do not offer a technical solution (or offer a technical solution that has low accuracy) that predicts information, such as job family, that corresponds to job titles.

Aspects of the disclosure address the above-mentioned and other challenges by training a machine learning model using training input data that includes training input including information that identifies job titles associated with multiple organizations. In some embodiments, the job titles include non-standardized job titles that refer to names of organization-specific personnel positions that are not standardized between the multiple organizations. The training input also includes target output that includes job families. A job family can identify a category of personal positions that are categorized based on one or more characteristics that are shared between the personnel positions of the category. The job families can be standardized by defining a job family using characteristics, such as functional characteristics (e.g., function of personnel positions) and skill and qualification characteristics (e.g., education and work experience).

In some embodiments, the training input can also include information identifying job descriptions that describe responsibilities associated with the respective job titles. In some embodiments, the training input can also include information identifying departments of the organizations that correspond with the job titles. In some embodiments, training inputs can include a target output that identifies an indication of job sub-families. A job sub-family can identify a sub-category of a category of personnel positions associated with the job family. In some embodiments, training inputs can include a target output that identifies an indication of job levels that identify hierarchical levels of responsibility within a job family or a job sub-family. For example, a job family or job sub-family can be further divided into job levels (e.g., expert level, intermediate level, entry level).

Instead of using keyword search approaches, aspects of the present disclosure train a machine learning model using one or more of job titles (e.g., non-standardized job titles), job descriptions associated with the job title, or departments associated with the job titles, and one or more of job families, job sub-families, or job levels as target outputs for the respective training inputs. Once the machine learning model is trained, the trained machine learning model can be used make a prediction of one or more of job family, job sub-family, or job level that corresponds to a non-standardized job title. One or more of job family, job sub-family, or job level can be associated with HR information that is representative of HR information collated from multiple organizations in different (or the same) industries. Job families, job sub-families, and job levels can be standardized (e.g., have a standard definition) such that each can correspond to or apply to multiple organization-specific personnel positions across multiple independent organizations in the same or different industries. Each of the job family, job sub-family, and job level can provide a successive level of granularity of personnel positions. The greater granularity can help refine the selection of relevant HR information pertaining to a particular job title. For example, HR information pertaining to a job level (of a job sub-family of a job family) can be more specific and nuanced than the HR information pertaining to a job family, for example. Relevant HR information for a job title can be identified at a data store (e.g., a database of HR information from 1000's of organizations in different industries) using one or more the job family, job sub-family, or job level that correspond to a job title. The relevant HR information can be provided to a user device, and be used for various purposes, such as benchmarking, for example.

In an illustrative example, a job title, "human resources compensation manager" is provided as input to the trained machine learning model. It can be noted that one or more of a job description or job department (e.g., HR) can be also be provided as input to the trained machine learning model. The outputs of the trained machine learning model indicate that the job family, "human resources" corresponds to the job title and the level of confidence indicates 97% confidence. The outputs of the trained machine learning model also indicate that the job sub-family, "compensation and benefits" corresponds to the job title and the level of confidence indicates 96% confidence. The outputs of the trained machine learning model indicate that the job level, "entry (L1)" corresponds to the job title and the level of confidence indicates 80% confidence. A job family engine can determine that both the job family and job sub-family exceed the threshold level of confidence, but the job level does not exceed the threshold level of confidence (e.g., the threshold level of confidence is set to 95% for job family, job sub-family, and job level). Job family engine searches the date store 106 for HR information that is associated with the job family, "human resources" and the job sub-family, "compensation and benefits." Job family engine determines that for the identified job family and job sub-family that the compensation range is $90,000-$130,000 annually, that health benefits typically include medical, dental, and vision, and that the retirement benefits include a 401k with 3% employer match. The HR information can be provided for presentation at a graphical user interface of a user device.

As noted, a technical problem addressed by embodiments of the disclosure is inaccurate and incomplete datasets. For example, benchmark HR information identified by conventional systems may be inaccurate and incomplete.

Also noted, another technical problem is the large amount of network bandwidth and computer processing resources that are consumed performing multiple and iterative searches for HR benchmarking data.

As also noted, another technical problem addressed by embodiments of the disclosure is the lack of accuracy of models in predicting information, such as job families, job sub-family, or job levels, that is associated with job titles. For example, many models have a low probability of predicting information, such as job family, that corresponds with a non-standardized job title.

A technical solution to the above identified technical problems may include training a machine learning model using information pertaining to job titles. Training data can be generated for the machine learning model. Generating the training input can include generating first training input that includes information that identifies job titles associated with multiple organizations, and generating target output that identifies an indication of job families. The training data can be provided to train the machine learning model.

Another technical solution to the above identified technical problems includes using a trained machine learning model with respect to information pertaining to a job tile. The trained machine learning model is provided first input including information identifying a job title associate with an organization. One or more outputs are obtained from the trained machine learning model. The one or more outputs identify an indication of the job family and a level of confidence that the job family corresponds to the job title.

Thus, the technical effect may include improving the accuracy and completeness datasets, such as HR benchmarking datasets.

Further, the technical effect may include reducing the overall bandwidth usage and computer processing usage of systems, such as systems that search for HR benchmarking data.

Further technical effects may include improving the accuracy of models in predicting information that is associated with job titles and/or job descriptions, such as job families, job sub-family, or job levels. Improving the accuracy of such models may again contribute to more efficient use of bandwidth and computer processing resources.

FIG. 1 illustrates an example system architecture 100, in accordance with some embodiments of the disclosure. The system architecture 100 (also referred to as "system" herein) includes a human resources (HR) platform 120, one or more server machines 130 through 150, a data store 106, and client devices 110A-110Z connected to a network 104.

In embodiments, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some embodiments, data store 106 is a persistent storage that is capable of storing content items (such as HR content, also referred to as "human resources (HR) information" herein) as well as data structures to tag, organize, and index the content items. Data store 106 may be hosted by one or more storage devices, such as main memory, magnetic or optical storage based disks, tapes or hard drives, NAS, SAN, and so forth. In some embodiments, data store 106 may be a network-attached file server, while in other embodiments data store 106 may be some other type of persistent storage such as an object-oriented database, a relational database, and so forth, that may be hosted by human resources platform 120 or one or more different machines coupled to the server human resources platform 120 via the network 104.

The client devices 110A-110Z may each include computing devices such as personal computers (PCs), laptops, mobile phones, smart phones, tablet computers, netbook computers, network-connected televisions, etc. In some embodiments, client devices 110A through 110Z may also be referred to as "user devices."

In some embodiments, the human resources platform 120 or server machines 130-150 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that may be used to provide a user with access to content items. For example, the human resources platform 120 may allow a user to consume, upload, and search for HR information. The human resources platform 120 may also include a website (e.g., a webpage) or application back-end software that may be used to provide a user with access to HR information.

In some embodiments, a "user" may be represented as a single individual. However, other embodiments of the disclosure encompass a "user" being an entity controlled by a set of users and/or an automated source. For example, a set of individual users federated as one or more departments in organization may be considered a "user."

In some embodiments, HR information can include information related to human resources. HR information can include, but is not limited to, one or more of compensation information (e.g., salary or annual salary increases), bonus information (e.g., amount of bonus payments and criterion to qualify for bonus payments), equity information (e.g., amount of grants, value of grants), merit-based reward information (e.g., type of reward, amount of reward, and criterion to quality for reward), health benefit information (information regarding health, vision and dental plans including the contents of the plans, cost of the plans, benefit plans for employees' family, and plan information for enrolled employees, such as claims and claims status), retirement benefit information (e.g., 401k and employee contribution matching), employee training information, tuition reimbursement information, among other information. The HR information can be granular such the each job family, job sub-family, and job level can be associated with specific and relevant HR information.

Human resources can refer to people (e.g., employees) that make up the workforce of an organization. In some embodiments, human resources platform 120 is part of an organization, such as a corporate organization. In other embodiments, human resources platform 120 can be a third-party platform. In some embodiments, the third-party human resources platform 120 is accessible, at least in part, by one or more users of an organization. For example, a third-party can provide HR services using the human resources platform 120 to one or more users of an organization. In embodiments, the user may access human resources platform 120 through a user account. The user may access (e.g., log in to) the user account by providing user account information (e.g., username and password) via an application on client device 110. In some embodiments, human resources platform 120 can store and host HR information and proved access to the HR information through client devices 110A-110Z. In some embodiments, human resources platform 120 includes job family engine 151. In some embodiments, job family engine 151 hosted by human resources platform 120 can perform aspects of the present disclosure.

Server machine 130 includes a training set generator 131 that is capable of generating training data (e.g., a set of training inputs and a set of target outputs) to train a machine learning model. Some operations of training set generator 131 are described in detail below with respect to FIG. 2A-3.

Server machine 140 includes a training engine 141 that is capable of training a machine learning model 160 using the training data from training set generator 131. The machine learning model 160 may refer to the model artifact that is created by the training engine 141 using the training data that includes training inputs and corresponding target outputs (correct answers for respective training inputs). The training engine 141 may find patterns in the training data that map the training input to the target output (the answer to be predicted), and provide the machine learning model 160 that captures these patterns. The machine learning model 160 may be composed of, e.g., a single level of linear or non-linear operations (e.g., a deep sequential network, i.e., a machine learning model that is composed of multiple levels of non-linear operations. An example of a deep sequential network is a neural network with one or more hidden layers, and such machine learning model may be trained by, for example, adjusting weights of a neural network in accordance with a backpropagation learning algorithm or the like. For convenience, the remainder of this disclosure will refer to the implementation as a neural network, even though some implementations might employ other type of learning machine instead of, or in addition to, a neural network. Various layers of the machine learning model 160 are further described in FIG. 2B, in accordance with some embodiments.

In some embodiments, the training set is obtained from server machine 130. Server machine 150 includes a job family engine 151 that provides current data (e.g., one or more of job titles, associated departments, or job descriptions) as input to trained machine learning model 160 and runs trained machine learning model 160 on the input to obtain one or more outputs. As described in detail below with respect to FIG. 4, in one embodiment job family engine 151 is also capable of identifying one or more of job families, job sub-families, or job levels from the output of the trained machine learning model 160 and extract confidence data from the output that indicates a level of confidence that one or more of the job families, job sub-families, or job levels corresponds to the respective job titles, and use the confidence data to identify HR information that pertains to one or more of respective one or more of the job families, job sub-families, or job levels.

In some embodiments, confidence data may include or indicate a level of confidence of that one or more of a job family, job sub-family, or job level corresponds to a job title. In one example, the level of confidence is a real number between 0 and 1 inclusive, where 0 indicates no confidence that one or more of a job family, job-sub family, or job level corresponds to a job title and 1 indicates absolute confidence that one or more of a job family, job-sub family, or job level corresponds to a job title.

Also as noted above, for purpose of illustration, rather than limitation, aspects of the disclosure describe the training of a machine learning model and use of a trained machine learning model. In other embodiments, a heuristic model or rule-based model can be used as an alternative. It should be noted that in some other embodiments, one or more of the functions of server machines 130, 140, and 150 or human resources platform 120 may be provided by a fewer number of machines. For example, in some embodiments server machines 130 and 140 may be integrated into a single machine, while in some other embodiments one or more of server machines 130, 140, 150, or human resources platform 120 may be integrated into a single machine. In addition, in some embodiments one or more of server machines 130, 140, or 150 may be integrated into the human resources platform 120.

In general, functions described in one embodiment as being performed by the human resources platform 120, server machine 130, server machine 140, or server machine 150 can also be performed on the client devices 110A through 110Z in other embodiments, if appropriate. In addition, the functionality attributed to a particular component can be performed by different or multiple components operating together. The human resources platform 120, server machine 130, server machine 140, or server machine 150 can also be accessed as a service provided to other systems or devices through appropriate application programming interfaces, and thus is not limited to use in websites.

Although embodiments of the disclosure are discussed in terms of human resources platforms, embodiments may also be generally applied to any type of platform or service.

In situations in which the systems discussed here collect personal information about users, or may make use of personal information, the users may be provided with an opportunity to control whether the human resources platform 120 collects user information (e.g., information about a user's HR information), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the human resources platform 120.

Figure 2A:
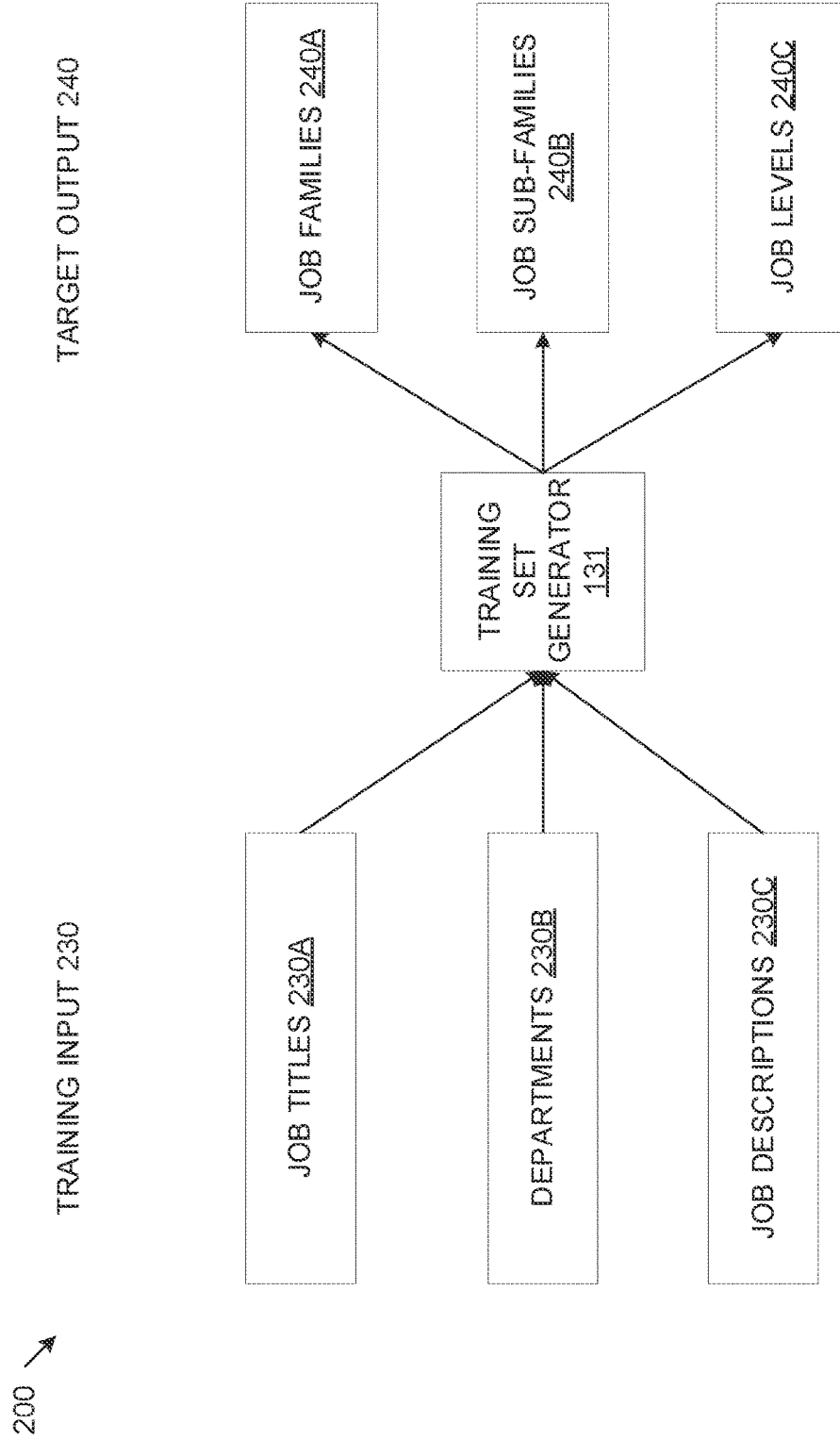
FIG. 2A is an example training set generator to create training data for a machine learning model using information pertaining to job titles, in accordance with some embodiments of the disclosure.

FIG. 2A is an example training set generator to create training data for a machine learning model using information pertaining to job titles, in accordance with some embodiments of the disclosure. System 200 shows training set generator 131, training inputs 230, and target outputs 240. System 200 may include similar components as system 100, as described with respect to FIG. 1. Components described with respect to system 100 of FIG. 1 may be used to help describe system 200 of FIG. 2.

In embodiments, training set generator 131 generates training data that includes one or more training inputs 230, and one or more target outputs 240. The training data may also include mapping data that maps the training inputs 230 to the target outputs 240. Training inputs 230 may also be referred to as "features," "attributes," or "information." In some embodiments, training set generator 131 may provide the training data in a training set, and provide the training set to the training engine 141 where the training set is used to train the machine learning model 160. Generating a training set may further be described with respect to FIG. 3.

In some embodiments, training inputs 230 may include one or more of job titles 230A associated with multiple organizations, departments 230B corresponding to respective job titles 230A, and job descriptions 230C corresponding to respective job titles 230A.

A job title can refer to a name of an organization-specific personnel position (e.g., organization-specific job) that is associated with a particular organization. For example, organization A can have an organization-specific personnel position with the job title, "Director of engineering." The job title can point to an organization-specific personnel position within particular organization's organizational hierarchy. An organizational hierarchy can refer to the organization of people within an organization according to job function or some other criteria. In some embodiments, organization-specific personnel position(s), as described herein can refer to personnel positions that are associated with a particular organization. Personnel position(s), as used herein, can refer to a personnel position that is associated with a job family (or job sub-family). In other embodiments, organization-specific personnel position and personnel positions can be used in interchangeably In some embodiments, job titles 230A are each associated with one of the multiple organizations. An organization can refer to an entity, such as a legal entity, that includes multiple people and that has a particular purpose. A non-limiting example of an organization includes a corporation (e.g., authorized by law to act as a single entity or legal entity) or partnership. In some embodiments, multiple organizations can describe one or more organizations that are independent or distinct from the other organizations of the multiple organizations. For example, a first organization can be corporation A and a second organization can be corporation B. Corporation A can be considered an independent legal entity from corporation B. Each of corporation A and corporation B make independent decisions, have a different hierarchical structure, and use different job titles.

In some embodiments, the multiple organizations are from different industries. An industry can include a group of organizations that are related based on their activities, such as business activities. For example, industries can include one or more of the aerospace industry, transport industry, computer industry, telecommunications industry, agricultural industry, construction industry, education industry, pharmaceutical industry, and food industry, among others.

In some embodiments, job titles 230A include non-standardized job titles. A non-standardized job titles can refer to a name of an organization-specific personnel position that is not standardized between one or more of the multiple organizations. As such, two non-standardized job titles can be different between two organizations but refer to similar organization-specific personnel positions that have similar responsibilities. For example, a first non-standardized job title, such as "electrical design engineer" associated with organization A can be different than a second non-standardized job title, "digital design engineer" associated with organization B. Both the first and the second non-standardized job title refer to respective organization-specific personnel positions having similar or comparable responsibilities, functions, job description, or the like. For instance, both the electrical design engineer and the digital design engineer can have responsibilities that include using software to develop microprocessors (e.g., place and route and simulation).

In some embodiments, training input 230 includes departments 230B that correspond to respective job titles 230A. For example, the job tile "human resources director" of organization A can correspond to the "human resources department" of organization A. The job tile "digital design engineer" of organization B can correspond to the "research and development (R&D) department" of organization B. In some embodiments, one or more of the departments are non-standardized departments. A non-standardized department can refer to a name of a department of an organization that is not standardized between the multiple organizations.

A department can refer to a group within an organization that contributes to an organization's mission or goals. Departments of an organization can be based on the function the department serves within the organization. For example, departments of an organization can include research and development (R&D), Marketing, Legal, Human Resources, Accounting, among other. Each of the various departments can include one or more employees that perform the function of the respective department.

In some embodiments, training input 230 includes job descriptions 230C. A job description can describe one or more of the responsibilities or skills and qualifications that are associated with a particular job title. For example, the job description associated with the job title, "digital design engineer" of organization B can include "Responsibilities include work in a team environment to create and engineer digital design subsystems from concept through to tape-out. You will model control loop feedback and signal processing algorithms using simulation tools and convert subsystems into real-world final designs for integration into final product. Skills and qualifications include a master's degree in electrical engineering and 5 plus years of technical experience in digital system design engineering." In one embodiment, target outputs 240 may include one or more of job families 240A, job sub-families 240B, or job levels 240C.

In some embodiments, target outputs 240 may include job families 240A. A job family can identify a category of personnel positions (e.g., jobs) that are categorized based on one or more characteristics that are shared between the personnel positions of the category. The different job families correspond to different categories of personnel positions that have different characteristics. In some embodiments, one or more job families are standardized job families that apply to the multiple organizations. A job family provides a common framework for similar work that is performed in different industries or organizations. An organization-specific personnel position associated with a job title can be specific to a particular organization. Different organization-specific personnel positions with different job titles can be part of the same (standardized) job-family. A job family can be standardized can be standardized such that a job family can correspond to or apply to organization-specific personnel positions across multiple independent organizations in the same or different industries.

In some embodiments, the characteristics of a job family can include one or more of common or shared knowledge, skills and qualifications, functions, or responsibilities. Example job families can include one or more human resources, finance, communications and corporate affairs, legal and compliance, administration, sales and marketing, customer service, supply chain, engineering and science, and hospitality, among others. In an example, the functional characteristics of the human resources job family include supporting the management of an organization's human resources. The functional characteristics of human resources job family can include one or more of developing human resource management strategies and policies to meet business needs, conducting activities concerned with one or more of recruitment, training and development, compensation and benefits, mobility, talent acquisition, diversity, employee relations, or payroll.

In some embodiments, target output 240 includes job sub-families 240B. A particular job family can include multiple job sub-families. A job sub-family includes a sub-category of a particular category of personnel positions that are associated with a particular job sub-family. A sub-category of personnel positions can also be categorized based on one or more characteristics that are shared between the personnel positions of the sub-category. The characteristics that are shared between the personnel positions of a sub-category can be the same or similar to the characteristics that are shared between the personnel positions of a category. The characteristics that are shared between the personnel positions of a sub-category can have a more narrow scope than the characteristics that are shared between the personnel positions of a category.

In an example, the human resources job family can include multiple job sub-families, such as HR leadership, HR generalist, employee relations, payroll, talent acquisition, and training and development, among others. In an example, the responsibility characteristics of the training and development job sub-family can include being responsible for employee career development. The functional characteristics of the training and development job sub-family can include planning, organizing, and developing training curricula, material and programs, evaluating third-party training, managing the delivery of internal and externally provided training. In another example, the responsibility characteristics of the compensation and benefits job sub-family can include determining compensation and benefits programs that align rewards with organizational goals. The functional characteristics of the compensation and benefits job sub-family can include one or more of analyzing and modeling merit and other salary increases, managing job evaluation systems, analyzing market data to assess an organization's competitive position, managing incentive programs, managing insurance programs, managing benefit programs, and managing retirement programs, among others.

In some embodiments, the target output includes job levels 240C. Job levels 204C can identify hierarchical levels of responsibility within a job family or job sub-family. In some embodiments, the job levels can be can be consistent across the job families or job sub-families. In other embodiments, the job levels can be specific to one or more job families or job sub-families where other job families or job sub-families have different associated job levels. The job levels 204C can recognize incremental changes in job scope or changes in the level of responsibilities within a job family or job sub-family. An example of job levels in descending order from highest to lowest can include, principle (level 6), expert (level 5), advanced (level 4), career (level 3), developing (level 2), and entry (level 1). Six levels are described of purpose of illustration, rather than limitation. The number of job levels can be any number in some embodiments.

In some embodiments, subsequent to generating a training set and training machine learning model 160 using the training set, the machine learning model 160 may be further trained (e.g., additional data for a training set) or adjusted (e.g., adjusting weights associated with input data of the machine learning model 160, such as connection weights in a neural network) using additional training inputs 230 and target outputs 240.

Figure 2B:
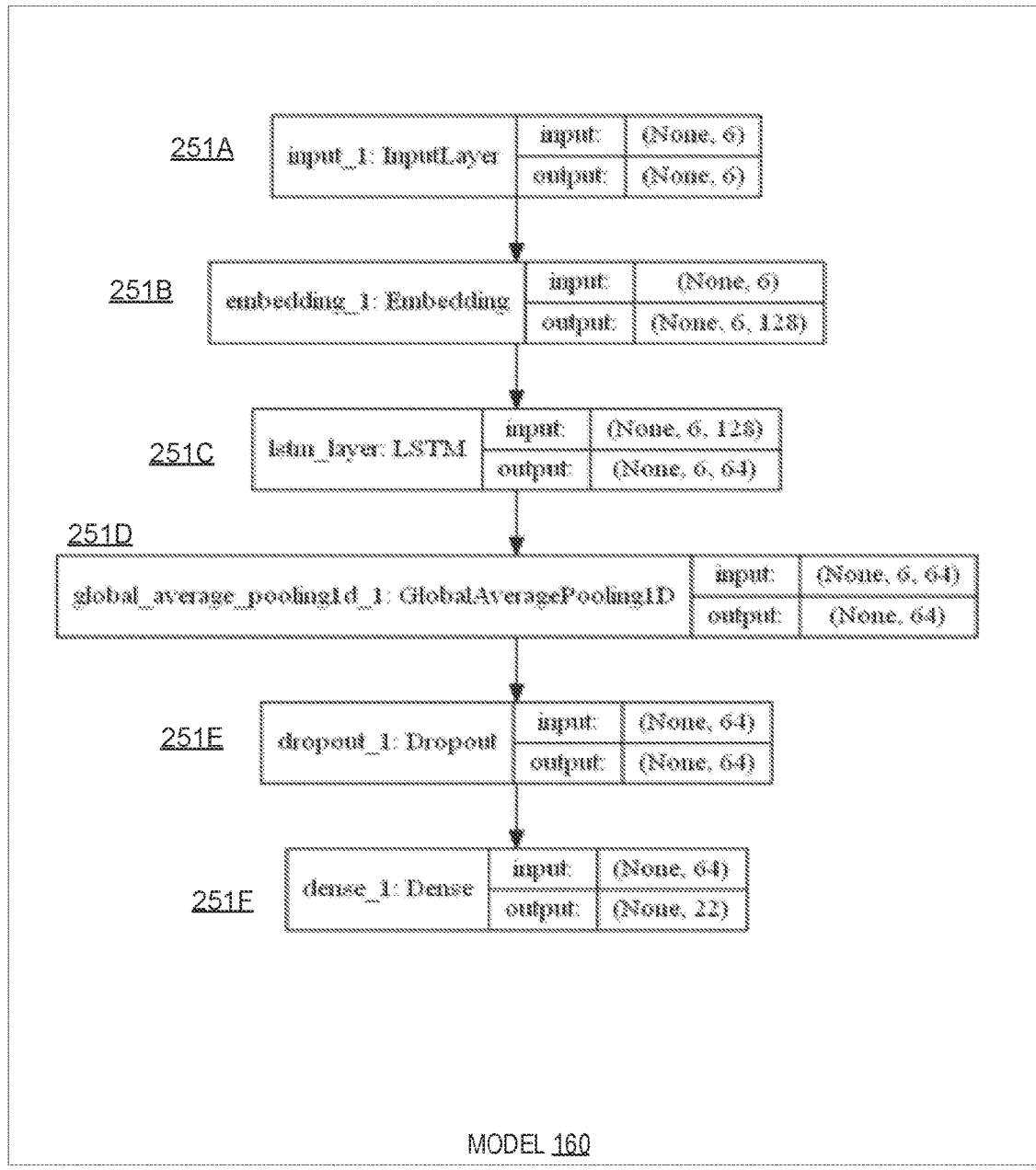
FIG. 2B depicts layers of a machine learning model, in accordance with some embodiments of the disclosure.

FIG. 2B depicts layers of a machine learning model, in accordance with some embodiments of the disclosure. Diagram 250 depicts machine learning model 160. Machine learning model 160 can be a trained machine learning model or untrained machine learning model. Machine learning model 160 can include one or more of layer 251A-251F (generally referred to as "layers 251" herein). In some embodiments, the layers 251 are fully connected layers. In a fully connected layer each element (e.g., neuron) of a subsequent layer receives input from every element of the previous layer (e.g., the output of the preceding layer is used as input to the subsequent layer). In some embodiments, the layers 251 are implemented serially such that the output of the preceding layer is used as input to the subsequent layer, and so forth. In some embodiments, some or all the layers 251 are implemented. In some embodiments, more or different layers can be implemented.

In some embodiments, layer 251A can include an input layer. The input layer can receive a digitalized array of words (e.g., input or training input that is converted to an array of integers) and directly pass the digitalized array of words to the subsequent layer.

In some embodiments, layer 251B can include a word embedding layer. A word embedding layer can bundle the words of the digitalized array into similar groups from a multi-dimensional space (e.g., multi-dimensional vector space). The word embedding layer can compress the input feature (i.e., digitalized array of words) into a smaller data structure.

In some embodiments, layer 251C can include a long-term and short-term memory (LSTM) layer that captures relationships for the sequential order of the words. An LSTM layer can learn the order dependence of input data. LSTM can recognize patterns in sequences of data and take time and sequence into account (e.g., have a temporal dimension).

In some embodiments, layer 251D can include a global average pooling layer. A global average pooling layer can receive a multi-dimensional input from an LSTM layer and flatten the multi-dimensional input into a single dimension by taking the average. In some embodiments, rather the global average pooling layer a global maximum pooling layer can be implemented. A global maximum pooling layer can receive a multi-dimensional input from an LSTM layer and down-sample regions of a multi-dimensional input (e.g., take the maximum of different regions) to reduce the dimensionality of the input.

In some embodiments, layer 251E can include a dropout layer. A dropout layer can remove (e.g., drop) some elements (e.g., neurons) along with their connections from a machine learning model. In some embodiments, the dropped elements are selected randomly. The dropout layer can reduce variance of a dataset.

In some embodiments, layer 251F can include a softmax layer. A softmax layer can output an array of probabilities (e.g., confidence data). For example, the softmax layer can provide confidence data indicative of the probability a particular job family corresponds to a job title. For instance, the job title input can be "Senior HR manager" and the output can be "95% probability the job title belongs to HR job family and 5% probability the job title belongs to Administration job family."

Figure 3:
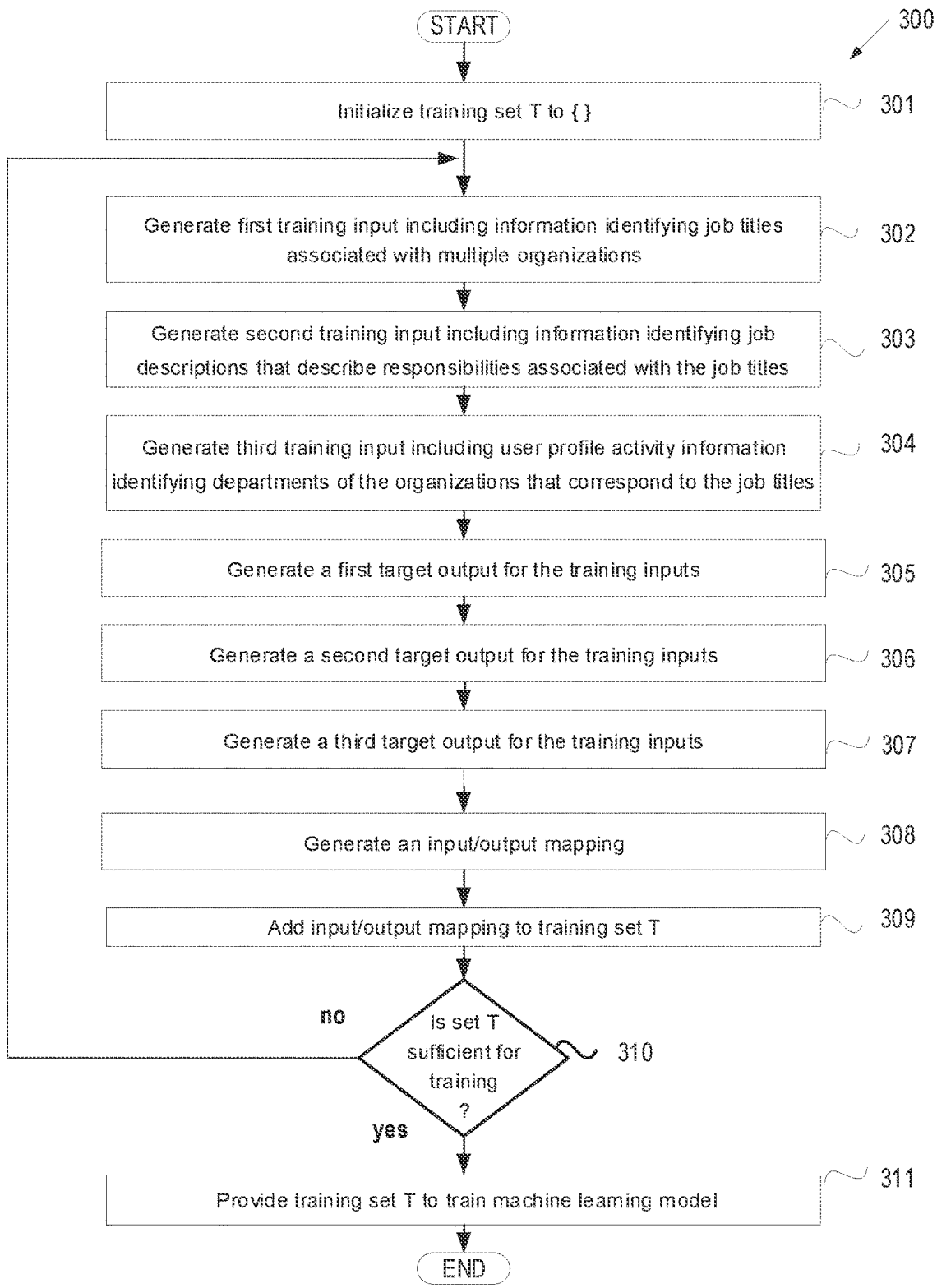
FIG. 3 depicts a flow diagram of one example of a method for training a machine learning model, in accordance with some embodiments of the disclosure.

FIG. 3 depicts a flow diagram of one example of a method 300 for training a machine learning model, in accordance with some embodiments of the disclosure. The method is performed by processing logic that may include hardware (circuitry, dedicated logic, etc.), software (e.g., instructions run on a processing device), or a combination thereof. In one embodiment, some or all the operations of method 300 may be performed by one or more components of system 100 of FIG. 1. In other embodiments, one or more operations of method 300 may be performed by training set generator 131 of server machine 130 as described with respect to FIGS. 1-2A. It may be noted that components described with respect FIGS. 1-2B may be used to illustrate aspects of FIG. 3. In some embodiments, the operations (e.g., blocks 301-311) can be the same, different, fewer, or greater. For instance, in some embodiments one or more training inputs can be generated or one or more target outputs can be generated.

Method 300 generates training data for a machine learning model. In some embodiments, at block 301 processing logic implementing method 300 initializes a training set T to an empty set.

At block 302, processing logic generates first training input that includes information identifying job titles 230A associated with multiple organizations (as described with respect to FIG. 2A).

At block 303, processing logic generates second training input including information identifying job descriptions 230C that describe responsibilities associated with the job titles 230A (as described with respect to FIG. 2A).

At block 304, processing logic generates third training input that includes information identifying departments 230B of the organizations that correspond with the job titles 230A.

At block 305, processing logic generates a first target output for one or more of the training inputs (e.g., training inputs one through three). The first target output provides an indication of job families 240A. A job family of the multiple job families 240A identifies a category of personnel positions that are categorized based on one or more characteristics that are shared between the personnel positions of the category.

At block 306, processing logic generates a second target output for one or more training inputs. The second target output provides an indication of job sub-families 240B that are associated with the job titles 230A. A job sub-family identifies a sub-category of the category of personnel positions associated with a job family.

At block 307, processing logic generates a third target output for one or more training inputs. The third target output provides an indication of the job levels 240C that identify hierarchical levels of responsibility within a job family or job sub-family.

At block 308, processing logic optionally generates mapping data that is indicative of an input/output mapping. The input/output mapping (or mapping data) may refer to the training input (e.g., one or more of the training inputs described herein), the set of target outputs for the training input (e.g., one or more of the target outputs described herein), and an association between the training input(s) and the target output(s). At block 309, processing logic adds the mapping data generated at block 308 to training set T.

At block 310, processing logic branches based on whether training set T is sufficient for training machine learning model 160. If so, execution proceeds to block 311, otherwise, execution continues back at block 302. It should be noted that in some embodiments, the sufficiency of training set T may be determined based simply on the number of input/output mappings in the training set, while in some other embodiments, the sufficiency of training set T may be determined based on one or more other criteria (e.g., a measure of diversity of the training examples, accuracy exceeding a threshold, etc.) in addition to, or instead of, the number of input/output mappings.

At block 311, processing logic provides training set T to train machine learning model 160. In one embodiment, training set T is provided to training engine 141 of server machine 140 to perform the training. In the case of a neural network, for example, input values of a given input/output mapping (e.g., numerical values associated with training inputs 230) are input to the neural network, and output values (e.g., numerical values associated with target outputs 240) of the input/output mapping are stored in the output nodes of the neural network. The connection weights in the neural network are then adjusted in accordance with a learning algorithm (e.g., back propagation, etc.), and the procedure is repeated for the other input/output mappings in training set T. After block 311, machine learning model 160 can be trained using training engine 141 of server machine 140. The trained machine learning model 160 may be implemented by job family engine 151 (of server machine 150 or human resources platform 120) to determine one or more of the job families, job sub-families, or job levels correspond to the job titles.

Figure 4:
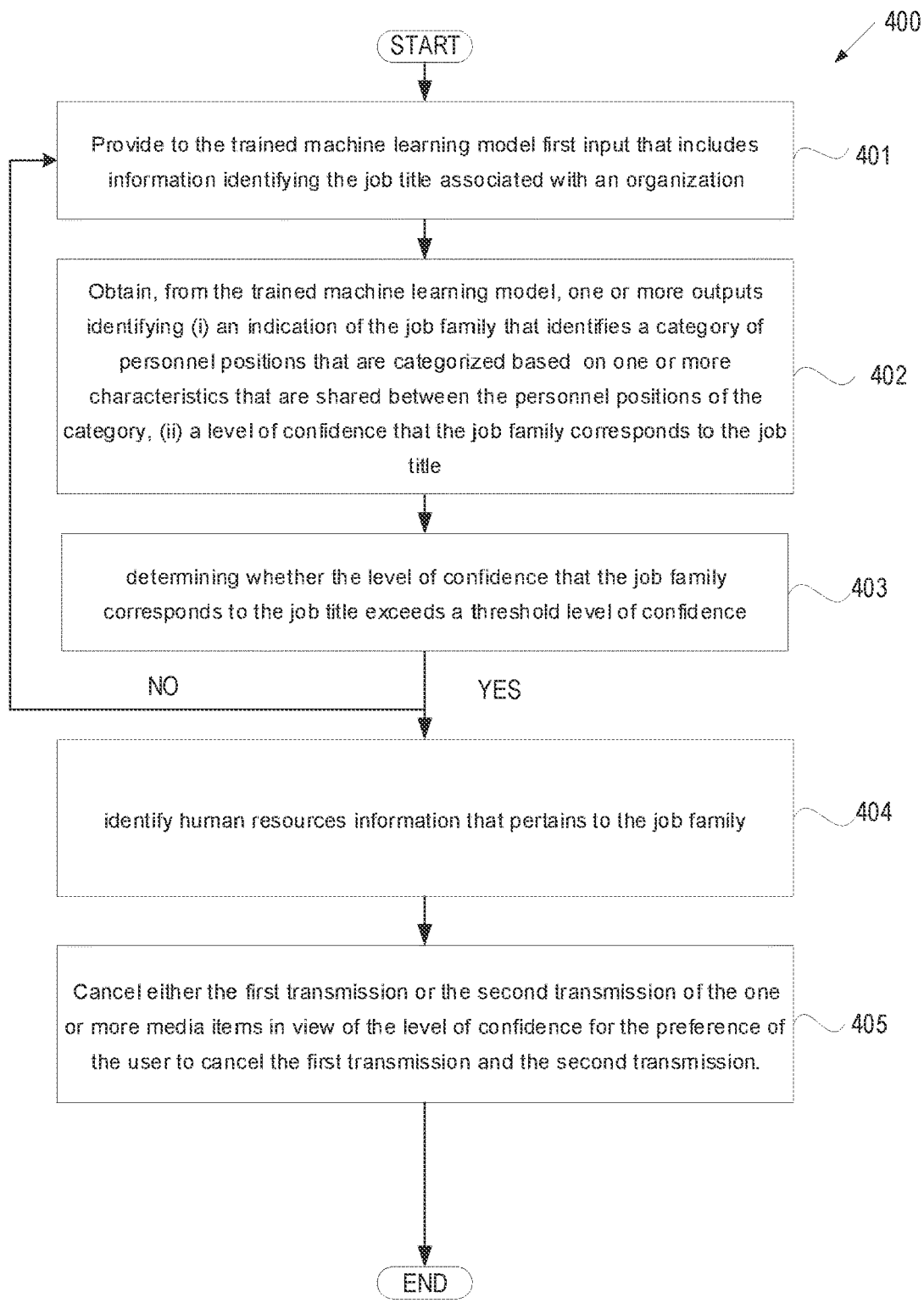
FIG. 4 depicts a flow diagram of one example of a method for using the trained machine learning model with respect to information pertaining to a job tile of multiple job titles to determine a job family that corresponds to the job title, in accordance with some embodiments of the disclosure.

FIG. 4 depicts a flow diagram of one example of a method 400 for using the trained machine learning model with respect to information pertaining to a job tile of multiple job titles to determine a job family that corresponds to the job title, in accordance with some embodiments of the disclosure. The method is performed by processing logic that may include hardware (circuitry, dedicated logic, etc.), software (e.g., instructions run on a processing device), or a combination thereof. In some embodiments, some or all the operations of method 400 may be performed by one or more components of system 100 of FIG. 1. In other embodiments, one or more operations of method 400 may be performed by job family engine 151 of server machine 150 or job family engine 151 of human resources platform 120 implementing a trained machine learning model, such as trained machine learning model 160 as described with respect to FIGS. 1-3. It may be noted that components described with respect FIGS. 1-2B may be used to illustrate aspects of FIG. 4.

Method 400 may begin at block 401 where processing logic implementing method 400 provides to the trained machine learning model first input that includes information identifying the job title associated with an organization of multiple organizations.

In some embodiments, the job title includes a non-standardized job title. The non-standardized job title associated with the organization refers to a name of an organization-specific personnel position of the organization that is not standardized between one or more of the multiple organizations.

In some embodiments, processing logic provides to the trained machine learning model second input including information identifying a job description that corresponds to the job title. The job description describes responsibilities associated with the job title.

In some embodiments, processing logic provides to the trained machine learning model third input including information identifying a department that corresponds with the job title.

At block 402, processing logic obtains, from the trained machine learning model, one or more outputs identifying (i) an indication of the job family that identifies a category of personnel positions that are categorized based on one or more characteristics that are shared between the personnel positions of the category, (ii) a level of confidence that the job family corresponds to the job title.

In some embodiments, the job family is a standardized job family that applies to the multiple organizations.

In some embodiments, obtaining, from the trained machine learning model, the one or more outputs includes identifying (i) an indication of a job sub-family that identifies a sub-category of the category of personnel positions associated with the job family, and (ii) a level of confidence that the job sub-family corresponds to the job title.

In some embodiments, obtaining, from the trained machine learning model, the one or more outputs includes identifying (i) an indication of a job level within the job family or sub-family. The job level identifies a hierarchical level of multiple hierarchical levels of responsibility within the job family and (ii) a level of confidence that the job level corresponds to the job title.

In some embodiments, the trained machine learning model includes one or more of an input layer, word-embedding layer, a long-term and short-term memory layer, a global average pooling layer, a dropout layer or a softmax layer.

At block 403, processing logic determines whether the level of confidence that the job family corresponds to the job title exceeds a threshold level of confidence (e.g., first threshold level of confidence). If the level of confidence that the job family corresponds to the job title exceeds the threshold level of confidence, processing logic proceeds to block 404. If the level of confidence that the job family corresponds to the job title does not exceed the threshold level of confidence, processing logic proceeds to block 401. In the below embodiments, if the level of confidence that the job family corresponds to the job title does not exceed the threshold level of confidence, processing logic returns to block 401.

In some embodiments, processing logic determines whether the level of confidence that the job sub-family corresponds to the job title exceeds the threshold level of confidence (e.g., second threshold level of confidence). If the level of confidence that the job sub-family corresponds to the job title does not exceed the threshold level of confidence and the level of confidence that the job family corresponds to the job title exceeds the threshold level of confidence, processing logic will discard the job sub-family and proceed to block 404. If the level of confidence that the job sub-family corresponds to the job title exceeds the threshold level of confidence and the level of confidence that the job family corresponds to the job title exceeds the threshold level of confidence, processing logic will proceed to block 404 and use the job sub-family in the operations described with respect to block 404 and 405.

In some embodiments, processing logic determines whether the level of confidence that the job level corresponds to the job title exceeds the threshold level of confidence (e.g., third threshold level of confidence). If the level of confidence that the job level corresponds to the job title does not exceed the threshold level of confidence and the level of confidence that the job family corresponds to the job title exceeds the threshold level of confidence, processing logic will discard the job level and proceed to block 404. If the level of confidence that the job level corresponds to the job title exceeds the threshold level of confidence and the level of confidence that the job family corresponds to the job title exceeds the threshold level of confidence, processing logic will proceed to block 404 and use the job level in the operations described with respect to block 404 and 405.

In some embodiments, the first, second, and third threshold level of confidence are the same threshold. In other embodiments, one or more of the first, second, or third threshold level of confidence are different thresholds.

At block 404, processing logic identifies human resources information that pertains to the job family. In some embodiments, processing logic can identify human resources information that pertains to the job family and one or more of the job sub-family or job level that corresponds with the job title. To identify the human resources information, processing logic can query human resources platform 120 or data store 106 of FIG. 1 to identify human resources information that corresponds to the identified job family (and possibly, to one or more of the job sub-family or job level). In some embodiments, the human resources information includes one or more of compensation information, health benefits information, or retirement benefits information pertaining to the job family (and possibly, to one or more of the job sub-family or job level).

Figure 5:
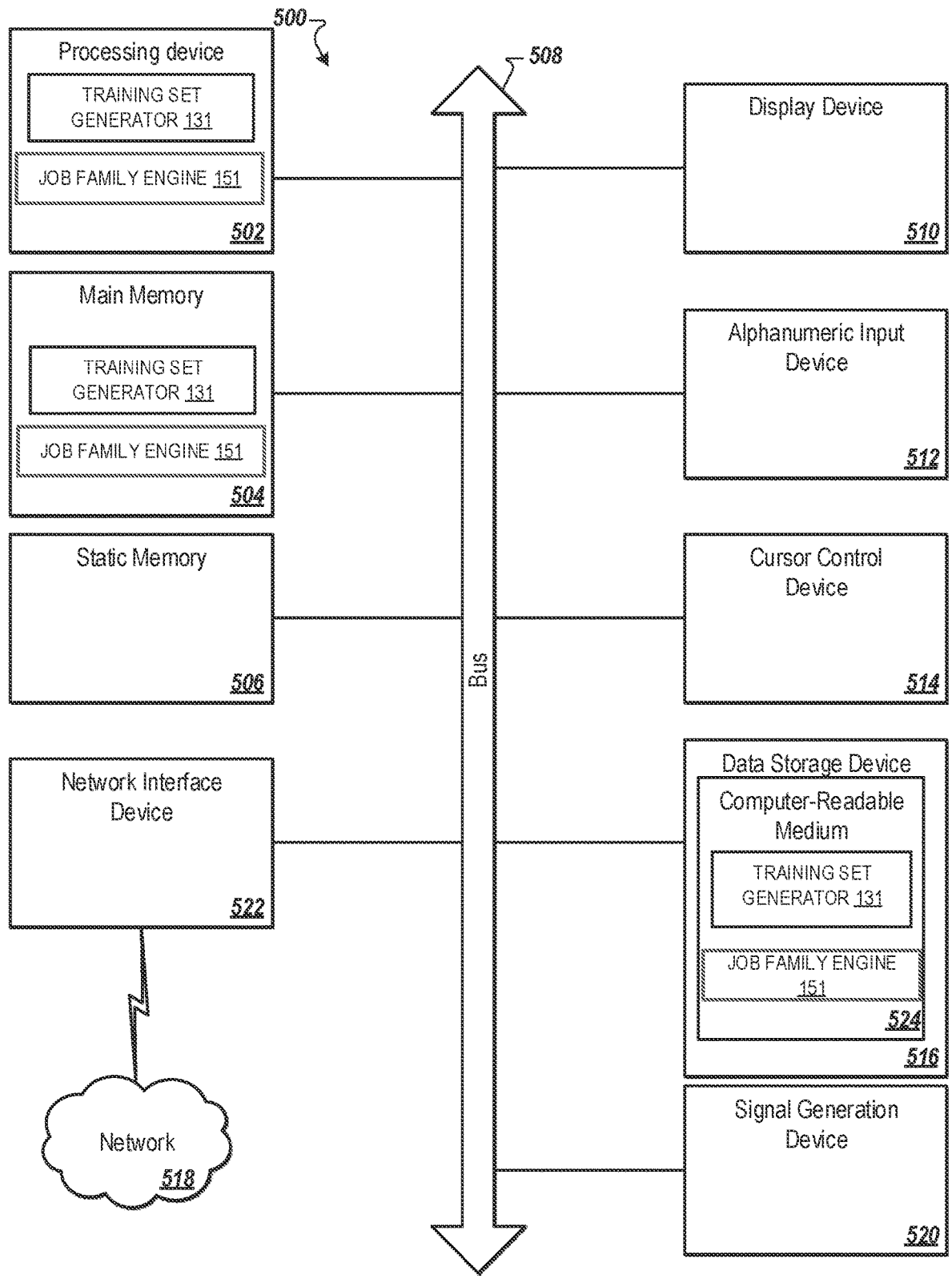
FIG. 5 is a block diagram illustrating an exemplary computer system, in accordance with some embodiments of the disclosure.

At block 405, processing logic provides the human resources information for presentation at a user device. FIG. 5 is a block diagram illustrating an exemplary computer system 500, in accordance with an embodiment of the disclosure. The computer system 500 executes one or more sets of instructions that cause the machine to perform any one or more of the methodologies discussed herein. Set of instructions, instructions, and the like may refer to instructions that, when executed computer system 500, cause computer system 500 to perform one or more operations of training set generator 131 or job family engine 151. The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 516, which communicate with each other via a bus 508.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute instructions of the system architecture 100 and the training set generator 131 or job family engine 151 for performing the operations discussed herein.

The computer system 500 may further include a network interface device 522 that provides communication with other machines over a network 518, such as a local area network (LAN), an intranet, an extranet, or the Internet. The computer system 500 also may include a display device 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a non-transitory computer-readable storage medium 524 on which is stored the sets of instructions of the system architecture 100 and of training set generator 131 or of job family engine 151 embodying any one or more of the methodologies or functions described herein. The sets of instructions of the system architecture 100 and of training set generator 131 or of job family engine 151 may also reside, completely or at least partially, within the main memory 504 and/or within the processing device 502 during execution thereof by the computer system 500, the main memory 504 and the processing device 502 also constituting computer-readable storage media. The sets of instructions may further be transmitted or received over the network 518 via the network interface device 522.

While the example of the computer-readable storage medium 524 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "generating", "providing", "obtaining", "identifying", "determining", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" throughout is not intended to mean the same implementation or embodiment unless described as such. The terms "first," "second," "third," "fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional embodiments, one or more processing devices for performing the operations of the above described embodiments are disclosed. Additionally, in embodiments of the disclosure, a non-transitory computer-readable storage medium stores instructions for performing the operations of the described embodiments. Also in other embodiments, systems for performing the operations of the described embodiments are also disclosed.

It is to be understood that the above description is intended to be illustrative, and not restrictive. Other embodiments will be apparent to those of skill in the art upon reading and understanding the above description. The scope of the disclosure may, therefore, be determined with reference to the appended claims, along with the full scope of equivalents to which such claims are entitled.

What is claimed is:

1. A method for using a trained machine learning model with respect to information pertaining to a job title of a plurality of job titles to determine a job family of a plurality of job families that corresponds to the job title, the method comprising:

providing, by a processing device, to the trained machine learning model first input comprising information identifying the job title associated with an organization of a plurality of organizations; and obtaining, from the trained machine learning model, one or more outputs identifying (i) an indication of the job family that identifies a category of personnel positions that are categorized based on one or more characteristics that are shared between the personnel positions of the category, (ii) a level of confidence that the job family corresponds to the job title.

2. The method of claim 1, wherein the job title comprises a non-standardized job title, wherein the non-standardized job title associated with the organization refers to a name of an organization-specific personnel position of the organization that is not standardized between one or more of the plurality of organizations, and wherein the job family is a standardized job family that applies to the plurality of organizations.

3. The method of claim 1, further comprising:
determining whether the level of confidence that the job family corresponds to the job title exceeds a threshold level of confidence; and
responsive to determining that the level of confidence exceeds the threshold level of confidence,
identifying human resources information that pertains to the job family, and
providing the human resources information for presentation at a user device.

4. The method of claim 3, wherein the human resources information comprises one or more of compensation information, health benefits information, or retirement benefits information associated with the job family.

5. The method of claim 1, further comprising:
providing to the trained machine learning model second input comprising information identifying a job description that corresponds to the job title, wherein the job description describes responsibilities associated with the job title.

6. The method of claim 1, further comprising:
providing to the trained machine learning model third input comprising information identifying a department that corresponds with the job title.

7. The method of claim 1, wherein obtaining, from the trained machine learning model, the one or more outputs further comprises:
identifying (i) an indication of a job sub-family that identifies a sub-category of the category of personnel positions associated with the job family, and (ii) a level of confidence that the job sub-family corresponds to the job title.

8. The method of claim 1, wherein obtaining, from the trained machine learning model, the one or more outputs further comprises:
identifying (i) an indication of a job level within the job family, wherein the job level identifies a hierarchical level of a plurality of hierarchical levels of responsibility within the job family, and (ii) a level of confidence that the job level corresponds to the job title.

9. The method of claim 1, wherein the trained machine learning model comprises one or more of a word-embedding layer, a long-term and short-term memory layer, a global average pooling layer, or a dropout layer.

10. A system for using a trained machine learning model with respect to information pertaining to a job title of a plurality of job titles to determine a job family of a plurality of job families that corresponds to the job title, the system comprising:
a memory; and
a processing device, coupled to the memory, to:
provide to the trained machine learning model first input comprising information identifying the job title associated with an organization of a plurality of organizations; and
obtain, from the trained machine learning model, one or more outputs identifying (i) an indication of the job family that identifies a category of personnel positions that are categorized based on one or more characteristics that are shared between the personnel positions of the category, (ii) a level of confidence that the job family corresponds to the job title.

11. The system of claim 10, wherein the job title comprises a non-standardized job title, wherein the non-standardized job title associated with the organization refers to a name of an organization-specific personnel position of the organization that is not standardized between one or more of the plurality of organizations, and wherein the job family is a standardized job family that applies to the plurality of organizations.

12. The system of claim 10, the processing device further to:
determine whether the level of confidence that the job family corresponds to the job title exceeds a threshold level of confidence; and
responsive to determining that the level of confidence exceeds the threshold level of confidence,
identify human resources information that pertains to the job family, and
provide the human resources information for presentation at a user device.

13. The system of claim 10, the processing device further to:
provide to the trained machine learning model second input comprising information identifying a job description that corresponds to the job title, wherein the job description describes responsibilities associated with the job title.

14. The system of claim 10, the processing device further to:
provide to the trained machine learning model third input comprising information identifying a department that corresponds with the job title.

15. The system of claim 10, the processing device further to:
identify (i) an indication of a job sub-family that identifies a sub-category of the category of personnel positions associated with the job family, and (ii) a level of confidence that the job sub-family corresponds to the job title.

16. The system of claim 10, wherein to obtain, from the trained machine learning model, the one or more outputs, the processing device further to:
identify (i) an indication of a job level within the job family, wherein the job level identifies a hierarchical level of a plurality of hierarchical levels of responsibility within the job family, and (ii) a level of confidence that the job level corresponds to the job title.

17. The system of claim 10, wherein the trained machine learning model comprises one or more of a word-embedding layer, a long-term and short-term memory layer, a global average pooling layer, or a dropout layer.

18. A non-transitory computer-readable medium comprising instructions for using a trained machine learning model with respect to information pertaining to a job title of a plurality of job titles to determine a job family of a plurality of job families that corresponds to the job title that, responsive to execution by a processing device, cause the processing device to perform operations comprising:
providing, by the processing device, to the trained machine learning model first input comprising information identifying the job title associated with an organization of a plurality of organizations; and
obtaining, from the trained machine learning model, one or more outputs identifying (i) an indication of the job family that identifies a category of personnel positions that are categorized based on one or more characteristics that are shared between the personnel positions of the category, (ii) a level of confidence that the job family corresponds to the job title.

19. The non-transitory computer-readable medium of claim 18, wherein the job title comprises a non-standardized job title, wherein the non-standardized job title associated with the organization refers to a name of an organization-specific personnel position of the organization that is not standardized between one or more of the plurality of organizations, and wherein the job family is a standardized job family that applies to the plurality of organizations.

20. The non-transitory computer-readable medium of claim 18, the operations further comprising:
   determining whether the level of confidence that the job family corresponds to the job title exceeds a threshold level of confidence; and
   responsive to determining that the level of confidence exceeds the threshold level of confidence,
   identifying human resources information that pertains to the job family, and providing the human resources information for presentation at a user device.

* * * * *